Oct. 8, 1974  J. M. ALEXANDER, JR  3,840,631

METHOD OF MAKING A COMPOSITE TABLET

Filed April 27, 1973  2 Sheets-Sheet 1

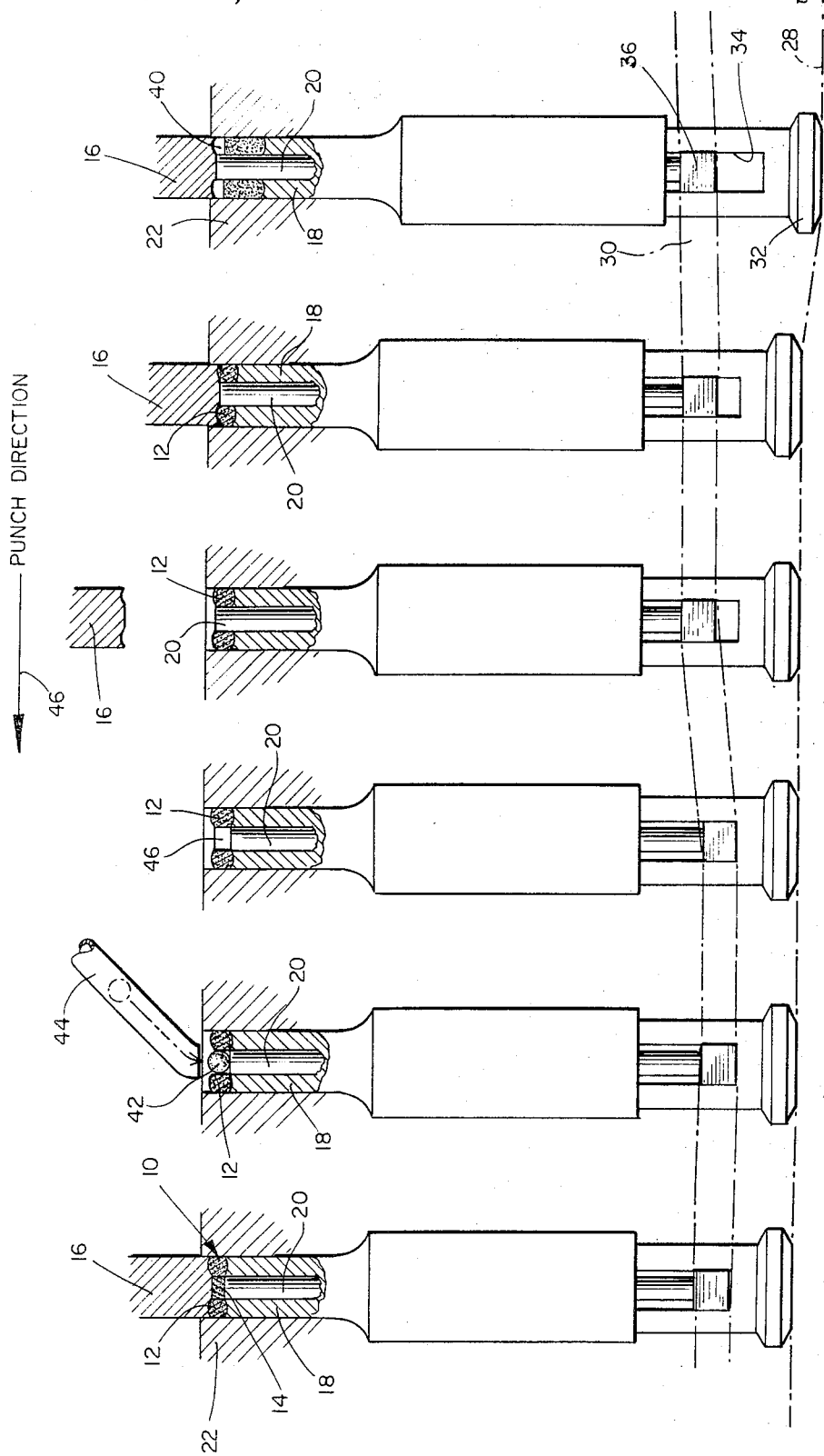

United States Patent Office 3,840,631
Patented Oct. 8, 1974

3,840,631
METHOD OF MAKING A COMPOSITE TABLET
John Mergle Alexander, Jr., Philadelphia, Pa., assignor to Pennwalt Corporation, Philadelphia, Pa.
Filed Apr. 27, 1973, Ser. No. 354,976
Int. Cl. D04h 1/10
U.S. Cl. 264—113
8 Claims

ABSTRACT OF THE DISCLOSURE

A composite tablet having an annular first portion and a centrally disposed second portion is made by first pre-forming the first portion and introducing into the hole of the first portion a pre-compressed sphere of material for forming the second portion, and compressing the first and second portions into interlocking relationship.

SUMMARY OF THE INVENTION

This invention relates to a method of making a composite tablet, more particularly a tablet having a first annular portion with its hole filled by a second portion. The invention is especially applicable to making composite tablets having such first and second portions made of different materials, or wherein such first and second portions are made of differently colored, similar materials.

Although methods have been proposed heretofore for making multi-layer tablets, coated tablets, and the like, the present invention is directed to making a composite tablet wherein the first portion is ring-shaped and the second portion is generally disc-shaped, with the second portion filling the hole of the first portion.

More specifically, the invention proposes first forming the first portion under a relatively light pressure into an annular shape, then providing a sphere pre-compressed at relatively light pressure and made of the material for the second portion. The sphere is sized to loosely fit the central hole of the first portion so that it may be conveniently inserted therein. In the final compression step, the first and second portions are fully compressed into interlocking relationship, preferably at pressures well above the pressures employed for preforming or pre-compressing the sphere and the first portion.

The composite tablet per se is not claimed to be a part of the present invention.

DESCRIPTION OF THE DRAWINGS

In the drawings:
FIGS. 4 through 13 are views, partly in vertical section and partly in elevation, showing the positions of the punch, core rod and associated parts during various stages of forming the tablet.

DESCRIPTION OF THE INVENTION

Figure 1:
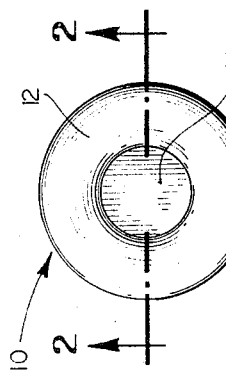
FIG. 1 is a plan view of a composite tablet made in accordance with the method of the present invention.
Figure 2:
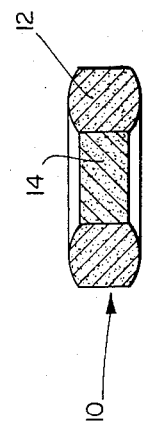
FIG. 2 is a sectional view, taken along lines 2—2 of the tablet shown in FIG. 1.

The composite tablet 10 shown in FIGS. 1 and 2 comprises an annular first portion 12 and a generally disc-shaped second portion 14 filling the hole of the first portion. Preferably, the first portion 12 is in the toroidal form of a ring-shaped doughnut or life buoy; that is, desirably it is generally circular in cross-section, with somewhat flattened inner and outer edges.

The annular first portion 12 is made of one material, usually a compressible powder which, when compressed to form a dense structure, will hold its shape. The second portion 14 is preferably made of another material, usually a compressible powder which, when compressed to form a dense structure, will also hold its shape. The first and second portions 12 and 14 of the composite tablet 10 may consist respectively of two candy materials, two pharmaceutical materials, a combination of candy and pharmaceutical materials, a combination of candy material or pharmaceutical material and another material, or any combination of two or more materials. It is also possible for the composite tablet 10 to have its two portions made respectively of two similar or identical materials having different colors, especially where the purpose of forming a composite tablet is for esthetic reasons, ease of identification, or to gain other visual advantages.

Apparatus of the general type for carrying out the method of the present invention is known in the art. In this connection, reference is made to U.S. Pats. Nos. 1,289,570; 2,043,085; 2,839,015 and 3,408,963. The cited patents disclose rotary tablet machines employing traveling tool assemblies. Such assemblies include opposing upper and lower punches which cooperate in a die to form tablets between them as they are passed between upper and lower pressure rolls and cam structures, and thereafter move to eject the tablets from the die. For the sake of brevity, such rotary tablet machines will not be described in detail. Rather, the disclosures of the cited patents are incorporated herein by reference. It will suffice to say that a tablet machine for carrying out the method of the present invention includes upper punches 16, lower punches 18, a core rod 20 within each lower punch 18, a die table 22, a metal scraping member 24, a felt scraping pad 26, cam structure 28 for operating the punches 16 and 18, and cam structure 30 for operating the core rod 20.

Figure 3:
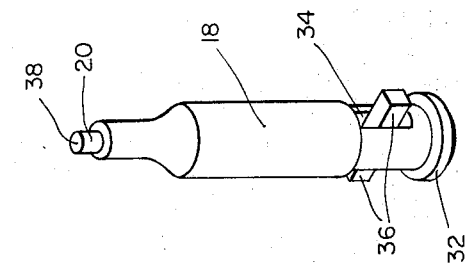
FIG. 3 is a perspective view of a lower punch used in a tablet press for making the tablets.

Referring now to FIG. 3, an assembly of the lower punch 18 and the core rod 20 will now be described. At the lower end of each lower punch 18, adjacent its enlarged end 32 which rides on the cam structure 28, is a vertically elongated slot 34 which extends longitudinally of the punch for a minor portion of its length. The slot 34 receives the inverted T-shaped lower end of the core rod 20, such lower end of the core rod 20 including horizontally extending end portions 36 which project well beyond the surface of the punch 18 into engagement with the cam structure 30. The upper end 38 of the core rod 20 is connected to the end portions 36 and is moved vertically thereby since it moves with the end portions 36 under control of the cam structure 30. The cam structures 28 and 30 serve independently to control the vertical positioning of the punches 16, 18 and core rods 20, respectively.

In describing the position of the punches 16, 18 and the core rod 20, general reference may be made to the punches 16, 18 and the core rod 20. However, it should be understood that in this context it is the forming surfaces, and their positions relative to one another and the die table which are being defined. For example, in FIG. 4, the lower punch assembly is shown in ejection position. In such FIG. 4 position, the core rod 20 and the lower punch 18 are at the level of the die table 22. More specifically, this is to be understood to mean that the forming surface at the upper end 38 of the core rod 20, and the forming surface at the upper end of the lower punch 18, are in general alignment with one another at approximately the level of the upper surface of the die table 22. As noted previously, such positional relationship is controlled by interaction of the cam structures 28 and 30 on the parts designated by the numerals 32 and 36. In the ejection position of FIG. 4, a completely formed composite tablet 10 has previously been elevated to the level of the die table 22 and swept off into a discharge chute (not shown); and a new cycle is ready to begin.

Figures 4, 5, 6, 7:
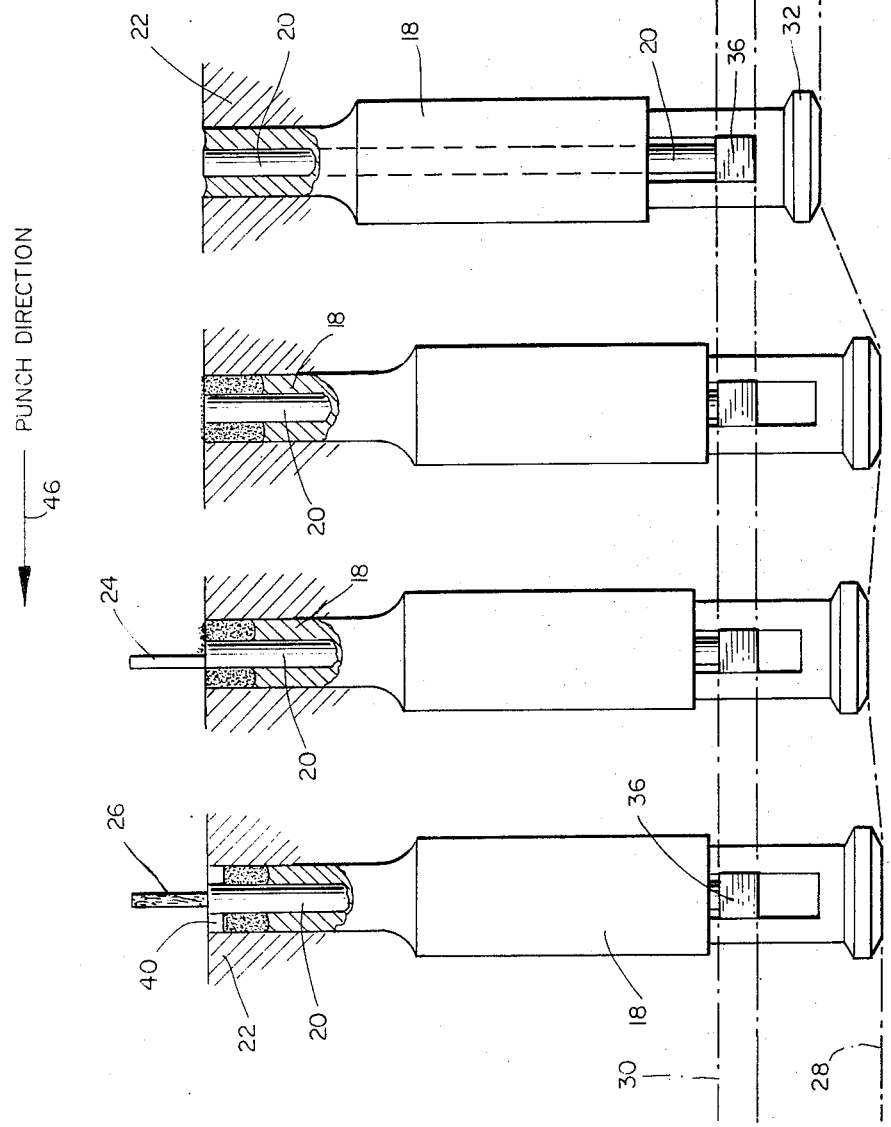

In FIG. 5, the core rod 20 remains at the level of the die table 22, however, the lower punch 18 is lowered from FIG. 4 position to provide an annular chamber 40 for the reception of uncompacted powder. Such powder comprises the first material, or material for forming the first portion 12. In this FIG. 5 position of parts, the upper punch 16 (not shown) is elevated to provide access to such chamber 40.

While moving to the position of FIG. 6, the core rod 20 remains in the position of FIG. 5 and the lower punch 18 is elevated slightly, thereby elevating some of the powder or overfill from the annular chamber 40 to above the level of the die table 22. The scraping member 24 is illustrated in the act of removing the overfill and levelling the charge to the level of the die table in order to have the desired volume of first material in the annular chamber.

The core rod 20 remains in the position of FIGS. 5 and 6 while advancing to the position of FIG. 7. However, the lower punch 18 is lowered to the position of FIG. 5, and the uncompacted first material in the annular chamber 40 falls to a level below the surface of the die table 22. In the FIG. 7 position of the parts, the felt scraping pad 26 will serve to remove any powder remaining on the upper end 38 of the core rod 20. This provision prevents subsequent comingling of first material with second material at the second portion 14.

As shown in FIG. 8, the lower punch 18 remains in the position of FIG. 7; the core rod 20 is lowered a very small distance to just below the level of the die table 22, and the upper punch 16 has been lowered to below the level of the die table 22. In this position, the die cavity has been completely closed and preforming of the first portion 12 in the annular chamber 40 is about to commence.

With mutually moving, oppositely directed force applied to the upper punch 16 and the lower punch 18, while the position of the core rod 20 is maintained, the first portion 12 is preformed to the shape shown in FIG. 9. Only about 80% of the final compression force is applied during this preforming step. Therefore, the density of the first material in the preformed first portion 12 is only about 80% of what its final density will be. The preforming step is nevertheless effective for the preformed, partly compacted first portion 12 to hold its shape until it is fully compacted during the final compression step.

In FIG. 10 position the upper punch 16 has been withdrawn upwardly, and the remaining parts are in FIG. 9 position. Following this, it is desirable to direct an air jet to the parts to clean them.

The core rod 20 is lowered to the level of the lower punch 18 surface while progressing to the FIG. 11 position, while the upper punch 16 remains withdrawn and the lower punch also remains in FIG. 10 position. By this action a central hole 40 is exposed in the preformed first portion 12.

The core placement position of parts is shown in FIG. 12. Without altering the position of any parts or items described with reference to FIG. 11, a preformed ball or sphere 42 made of second material is deposited into the die cavity and located within the hole 40 of the first portion 12. The sphere 42 is preformed with about 80% of the compaction force which will be used during the final compression step; and, like the preformed first portion 12, it is compacted to about 80% of the density which is desired in the final composite tablet 10. With such densities in mind, the sizal relationship of the sphere 42 to the hole 40 and the first portion 12 is such that the sphere 42 will loosely fit into the hole 40 and yet remain substantially centered therein. A radial clearance of at least .007 or .008 inch provides such loose fit, and keeps the sphere 42 centered in the hole 40. To facilitate delivering and inserting the sphere 42 into the hole 40, a tube 44 is provided, the outlet of which overlies and faces the hole 40. The tube 44 need not extend in the general direction of punch travel indicated by the arrow 46, but it may extend transverse thereto or at another acute angle thereto. Advantageously, the rollable sphere 42 lends itself to convenient storage, delivery, and release to the die cavity, as well as convenient and accurate delivery and insertion to the hole 40, since it moves with little resistance and positions itself effortlessly in the illustrated surroundings.

Referring now to FIG. 13, the final forming step is illustrated. In this view the lower punch 18 and the core rod 20 remain in the same position shown in FIG. 12. The upper punch 16 has descended to below the level of the die table 22 and maximum compression forces in mutually moving, opposite directions are applied by the upper punch 16 against both the core rod 20 and the lower punch 18, thus compacting the first portion 12 and the second portion 14 between such forming parts to maximum density. Stated another way, the final compaction force is approximately 25% greater than the compaction forces applied when preforming the sphere 42 and the preformed first portion 12. With the core rod 20 at the level of the lower punch 18, some of the vertical compaction force is transmitted in lateral or horizontal directions to the interface between the first and second portions 12, 14. As a result of this lateral force, the powder granules of the first and second materials press against one another along the interface between such first and second portions and effectively interlock them together. During the final forming step, the spherical shape of the sphere 42 is reformed as a disc-shaped core within the hole 40. It will be clear that this is possible because the final forming step employs compressive forces which exceed the forces employed for preforming the sphere 42. It will also be noted that the final composite tablet 10 is somewhat thinner than the preformed first portion 12, again because greater forces are employed during final compression than during performing.

Following the final forming step of FIG. 13, the upper punch 16 is withdrawn upwardly, and the lower punch 18 and core rod 20 are moved upwardly in unison to the level of a die table 22, into the position of FIG. 4, thereby ejecting tablet 10 from the die cavity.

The method described above has been found to be dependable and effective for forming a composite tablet of the type described. The concentric circles representing the outer edge of the tablet and the interface between the first and second portions 12, 14, as seen in FIG. 1, are accurately formed. Even when the first and second portions of the tablet are of contrasting colors, the final product has a neat and attractive appearance. The effectiveness of the method described above is attributed in no small measure to the steps of preforming a spherical core for insertion into a preformed ring, and finally compressing them together in the manner described.

What is claimed is:

1. A method of forming a tablet, including a first portion of toroidal shape and a second portion disposed centrally of said first portion with a tablet making machine, wherein said first portion is made of one powder material and said second portion is made of a second powder material, comprising the steps of:
   (a) providing opposed upper and lower punches defining a die cavity;
   (b) introducing said one powder material into said die cavity;
   (c) compressing said first portion from said one material with said upper and lower punches into a torodial shape having a central hole sufficient to hold its shape;
   (d) providing a pre-compressed sphere of said second material which loosely fits into the central hole of said first portion;
   (e) placing said pre-compressed sphere into the central hole of said first portion; and
   (f) compressing said first and second portions within said die cavity into final shape and into interlocking relationship with one another with said punches to provide a unitary tablet structure.

2. A method according to claim 1 wherein said one and second powder materials are of different color.

3. A method according to claim 1 wherein said first portion is mechanically preformed at a compacting pressure which is substantially less than the compacting pressure applied during the step (f) of compressing said first and second portions.

4. A method according to claim 1 wherein said sphere is mechanically preformed at a compacting pressure which is substantially less than the compacting pressure applied during the step (f) of compressing said first and second portions.

5. A method according to claim 4 wherein the sphere is mechanically preformed with compacting pressure which is about 80% of the compacting pressure applied during step (f).

6. A method according to claim 1 wherein said sphere and said first portion are mechanically preformed at a compacting pressure which is substantially less than the compacting pressure applied during the step (f) of compressing said first and second portions.

7. A method according to claim 1 wherein the radial clearance between said sphere and the preformed first portion in step (d) is about .008 inch.

8. A method according to claim 1 wherein said one and second powder materials are made of compactable powders.

References Cited

UNITED STATES PATENTS 3,408,963   11/1968   Alexander, Jr., et al. __ 425—353

FOREIGN PATENTS 588,635   5/1947   England _____ 264—245

ROBERT F. WHITE, Primary Examiner

J. R. HALL, Assistant Examiner

U.S. Cl. X.R.

264—119, 245